United States Patent [19]
Kuribayashi

[11] Patent Number: 5,615,189
[45] Date of Patent: Mar. 25, 1997

[54] DIGITAL AUDIO SYNCHRONOUS PLAYER

[75] Inventor: Hirotaka Kuribayashi, Hamamatsu, Japan

[73] Assignee: Yamaha Corporation, Japan

[21] Appl. No.: 450,794

[22] Filed: May 25, 1995

Related U.S. Application Data

[63] Continuation of Ser. No. 12,431, Feb. 2, 1993, abandoned.

[30] Foreign Application Priority Data

Feb. 4, 1992 [JP] Japan ..................................... 4-019252

[51] Int. Cl.⁶ ...................................................... G11B 7/00
[52] U.S. Cl. ................................. 369/50; 369/58; 369/59; 369/48; 369/84; 360/51; 360/32
[58] Field of Search ................................. 369/86, 48, 47, 369/49, 50, 53, 54, 58, 59, 124, 32, 85; 360/14.1, 14.2, 32, 27, 28, 51, 48

[56] References Cited

U.S. PATENT DOCUMENTS

| | | | |
|---|---|---|---|
| 4,603,412 | 7/1986 | Yamazaki | 369/50 |
| 4,942,551 | 7/1990 | Klappert et al. | |
| 5,008,875 | 4/1991 | Tomoda et al. | 369/85 |
| 5,253,243 | 10/1993 | Suzuki | 369/48 |

FOREIGN PATENT DOCUMENTS

| | | |
|---|---|---|
| 61-9883 | 1/1986 | Japan . |
| 4-30384 | 2/1992 | Japan . |

*Primary Examiner*—Muhammad N. Edun
*Attorney, Agent, or Firm*—Graham & James LLP

[57] ABSTRACT

A digital audio synchronous player includes a memory, a first reading circuit, a second reading circuit, a word clock signal generating circuit, and synchronizing signal generating circuit. The memory stores audio data having a plurality of words which represent digitally recorded audio signals, together with data relating to recording conditions. The first reading circuit reads out said audio data stored in said memory. The second reading circuit reads out said data relating to recording conditions stored in said memory. The word clock signal generating circuit generates a word clock signal each time a number of words of said audio data read by said first reading circuit reaches a value determined based on said data relating to recording conditions read by said second reading circuit. The synchronizing signal generating circuit generates a synchronizing signal based on said word clock signal.

19 Claims, 3 Drawing Sheets

DIGITAL AUDIO SYNCHRONOUS PLAYER

This is a continuation of application Ser. No. 08/012,431 filed on Feb. 2, 1993 now abandoned.

BACKGROUND OF THE INVENTION

1. Field of the Invention

The present invention relates to a digital audio synchronous player which digitally records and/or plays back audio signals and particularly relates to a digital audio synchronous player which generates a synchronizing signal and conducts synchronous playback based on this synchronizing signal.

2. Prior Art

Conventional digital audio recorders/players respectively have their own master clocks, each of which generates a clock (a clock signal) corresponding to fixed sampling frequency Fs (for example, 48 kHz, 44.1 kHz, 32 kHz, and the like), and conduct recording and playback of musical tones (audio signals) and the like based on the generation periods of these clocks.

However, there are slight deviations among the clock-generation-timings of the master clocks. These deviations are produced by external causes such as temperature variations, not only among different-type players, but also among the same-type players.

When a plurality of conventional digital audio synchronous players using such master clocks simultaneously play back musical tones, because of deviations among their playback speeds, it is difficult to accurately conduct simultaneous playback among the plurality of conventional digital audio synchronous players.

Technology was conventionally known in which time codes were stored with audio data, and synchronous playback was conducted based on these time codes. This technology will be explained, for example, using a case in which the synchronous play of two players is conducted.

First, as shown in FIG. 3, two digital audio players are connected to a synchronizer, and during playback, time codes are read out with the audio data in each player. The synchronizer uses the time code read out from one player as a standard, and governs the reading speed of the other player so that the time code of the other player is in agreement. By means of this, synchronization can be conducted so that the playback speeds of the two players are in agreement. That is to say, one player is used as a master, while the other player is used as a slave.

Furthermore, the synchronous playback among the digital audio players and MIDI sequencers (instruments having the MIDI) is fundamentally identical to that given above. However, the synchronous playback of the MIDI sequencers has been considered only between the MIDI sequencers themselves, it is necessary to provide, as shown in FIG. 4, in place of the synchronizer described above, an interface which reads the master time code and converts this time code to a MIDI clock. The "MIDI" means "Musical Instrument Digital Interface".

In the two methods described above, it is necessary to provide a special track for the storing of time codes which is separate from the track which stores audio data. However, when this is intended as a storage medium, the special track for the time code is a completely wasted region, so that there was a problem in that, with respect to digital audio recorders/players, the number of tracks capable of recording was reduced by the number of special tracks for the time codes.

SUMMARY OF THE INVENTION

The present invention was created in light of the above circumstances; it is an object thereof to provide a digital audio synchronous player which is capable of generating synchronizing signals without storing time codes, and which is capable of conducting accurate synchronous playback.

In accordance with an aspect of the present invention, a word clock generating mechanism generates a word clock each time the number of words of the audio data reaches a number which is specified based on data relating to the recording conditions. The word clock generating mechanism conducts the generation of synchronizing signals based on this word clock, so that there is no need to store time codes.

One sample data sampled of audio signals sampled at the sampling frequency is is called one "word". Therefore, "the number of words" means the number of sample data (sample values). The "word clock" is the generated clock signal based on the above the numbers of words.

Furthermore, the data which is stored in the memory mechanism consists, aside from audio data, solely of data relating to the recording of audio data, so that it is possible to greatly reduce the wasted region in the recording medium, and it is possible to greatly limit the memory capacity which is necessary in the storage mechanism.

Furthermore, in accordance with another aspect of the present invention, the word clock generation mechanism generates word clocks each time the number of words of the audio data reaches a number specified based on data relating to the recording conditions. Based on this word clock and a synchronizing signal which is inputted by an input mechanism, a read control mechanism controls the reading speed of the audio data, and synchronous play is conducted. Accordingly, it is not necessary to store time codes, and furthermore, the data which are stored in the memory mechanism consist, aside from audio data, solely of data relating to audio data recording and to the sample word count, so that it is possible to greatly reduce the wasted region in the recording medium, to greatly limit the memory capacity which is necessary in the memory mechanism, and to effectively utilize the recording medium.

BRIEF DESCRIPTION OF THE DRAWINGS

The foregoing brief description, as well as further objects, features, and advantages of the invention will be understood more completely from the following detailed description of the presently preferred, but none the less illustrative, embodiment of the invention, with reference being had to the drawings, in which.

DETAILED DESCRIPTION OF THE PREFERRED EMBODIMENT

Figure 1:
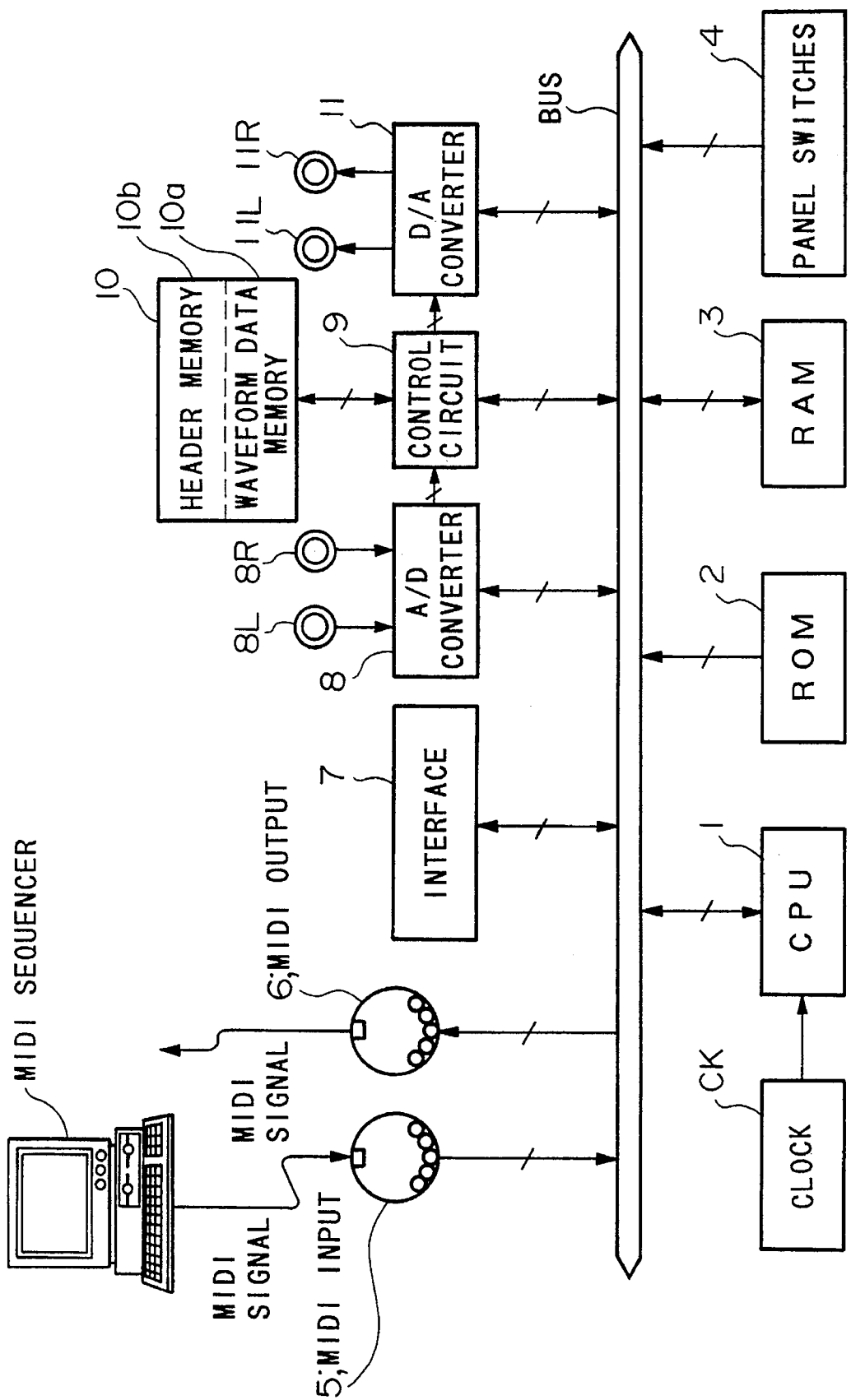
FIG. 1 is a block diagram showing a structural outline of a digital audio synchronous player in accordance with the present invention.

Hereinbelow, the digital audio synchronous player will be explained with reference to the diagrams. FIG. 1 is a block diagram showing the structure thereof.

In the diagram, CPU (Central Processing Unit) 1 executes a program based on clock CK, conducts various types of calculation and processing, and controls the various sections which are connected to the bus. ROM (Read Only memory) 2 stores the programs and the like which are used in CPU 1. RAM (Random Access Memory) 3 has work areas and the like for programs, and temporarily stores various types of data. Panel switch 4 comprises switches which conduct various settings, and this setting data is supplied to CPU 1 through the bus.

MIDI input terminal 5 inputs the MIDI signal. MIDI output terminal 6 outputs the MIDI signal. The external MIDI sequencer is connected through of the MIDI input terminal 5 and supplies the MIDI signal. A MIDI clock indicating a synchronizing signal is incorporated in this MIDI signal.

Interface 7 is provided between this sequencer and external instruments, in the case in which MIDI input terminal 5 and MIDI output terminal 6 are not interposed, in order to send and receive signals.

A/D (Analogue-Digital) converter 8 converts audio signals supplied to input terminals 8L and 8R to various digital signals, and supplies these signals to control circuit 9. The audio signals which are supplied to input terminals 8L and 8R are stereo signals, and the L signal is supplied to input terminal 8L, while the R signal is supplied to input terminal 8R.

Control circuit 9 reads and writes with respect to PCM (Pulse Code Modulation) memory 10. The details of this control circuit 9 will be given hereinbelow.

PCM memory 10 is a memory device, and comprises waveform data memory 10a and header memory 10b. Audio data consisting of digitally converted audio signals is stored in the waveform data memory 10a, and furthermore, data corresponding to this audio data information, for example, recording time, number of sample words, sampling frequency Fs, and the like, are stored in the header memory 10b.

D/A (Digital-Analogue) converter 11 converts digital signals into analog signals, and supplies the convened L signal from the output terminal 11L, and supplies the converted R signal from output terminal 11R to external instruments as output signals. The details of control circuit 9 will be explained with reference to FIG. 2. In the diagram, writing circuit $9_1$ writes the audio data which have been converted from analog to digital and are to be recorded into waveform data memory 10a, and furthermore, writes data corresponding to this audio data information into header memory 10b.

Header read circuit $9_2$ reads various data from header memory 10b, and supplies, from among the various data which were thus read, the sampling frequency Fs data to audio data read circuit $9_3$, and furthermore, supplies the recording time and the number of sample word data to computing circuit $9_4$. Furthermore, the tempo data of the MIDI clock which was set by means of the panel switch 4 are supplied to computing circuit $9_4$ through the medium of a bus. These tempo data are set in accordance with the MIDI sequencer which is connected.

Computing circuit $9_4$ calculates a word clock control data P value based on the data of the recording time, the number of sample words, and based on the tempo data, and supplies this value to audio data read circuit $9_3$. Computing circuit $9_4$ produces a value of the word clock control data P by conducting, for example, a calculation such as that shown below.

$$P = \frac{60}{\text{tempo} \times 24} \cdot \frac{\text{number of sample words}}{\text{recording time}} \quad (A1)$$

Here, to explain the coefficients of Formula (A1), the "tempo" on the denominator of this formula indicates the number of crotchets in a period of 1 minute, and in the same way, "24" on the denominator of this formula indicates the MIDI clock number corresponding to the number of crotchets, while "60" on the numerator of this formula indicates the number of seconds in a period of 1 minute.

Formula (A1) is an example of such a calculation. The coefficients described above can be set to desired values based on conditions.

The word clock control data P which are obtained by means of Formula (A1) set the fixed number of words in audio data read circuit $9_3$.

Here, for example, in the case in which the tempo of the MIDI clock is set equal to "120", the recording time is set equal to "10" minutes (="600" seconds), and the number of sample words is set equal to "26,460,000" (sampling frequency Fs=44.1 kHz), the value of the word clock control data P is:

$$P = \frac{60}{120 \times 24} \cdot \frac{26,460,000}{600} \quad (A2)$$
$$\cong 918$$

In this case, computing circuit $9_4$ is set so as to create a word clock each time that 918 words of the audio data have been read with respect to the audio data read circuit $9_3$.

Audio data read circuit $9_3$ reads audio data from the waveform data memory 10a, and supplies these data to the D/A converter 11 shown in FIG. 1, and creates a word clock each time 918 words have been read and supplies this to reading control circuit $9_5$.

Here, the precise result of the calculations in Formula (A2) is "918.75". The audio data read circuit $9_3$ has a function such that the "0.75" to the right of the decimal point is resolved. For example, the word clock will be created for the first time after 918 words, for the second, third, and fourth times after 919 words, and for the fifth time after 918 words.

The reading control circuit $9_5$ compares the timing of the MIDI clock which is supplied by the MIDI sequencer with the timing of the word clock, and controls the reading speed of the audio data read circuit $9_3$.

Next, explanation will be given with regard to the operation of the present preferred embodiment having the above described structure, using as an example a case in which synchronous play is conducted with a MIDI sequencer.

First, when power is supplied to the player which is the present preferred embodiment, CPU 1 zero-resets all the registers within RAM 3, and furthermore, conducts initializing processing such as the writing of preset values into various variables of the peripheral circuits. After the completion of this initializing processing, a directive from panel switch 4 is awaited. Such a state can be divided into the following 2 types of directives.

(1) Recording directive operation

This a directive which causes the audio signal supplied from external sources to be stored in PCM memory 10.

Figure 2:
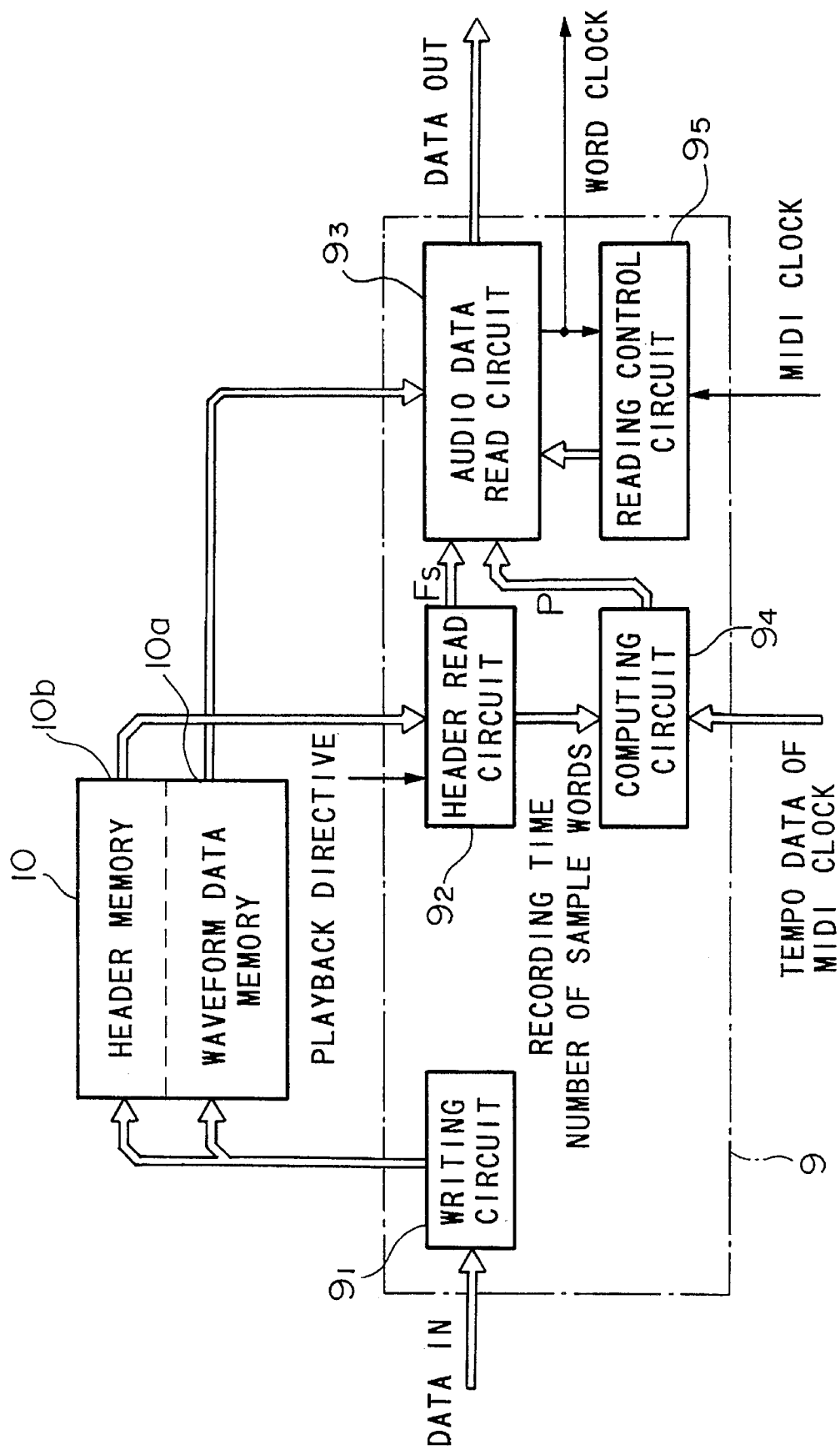
FIG. 2 is a block diagram showing the structural details of the control circuit 9 and the PCM memory 10 in FIG. 1.
Figure 3:
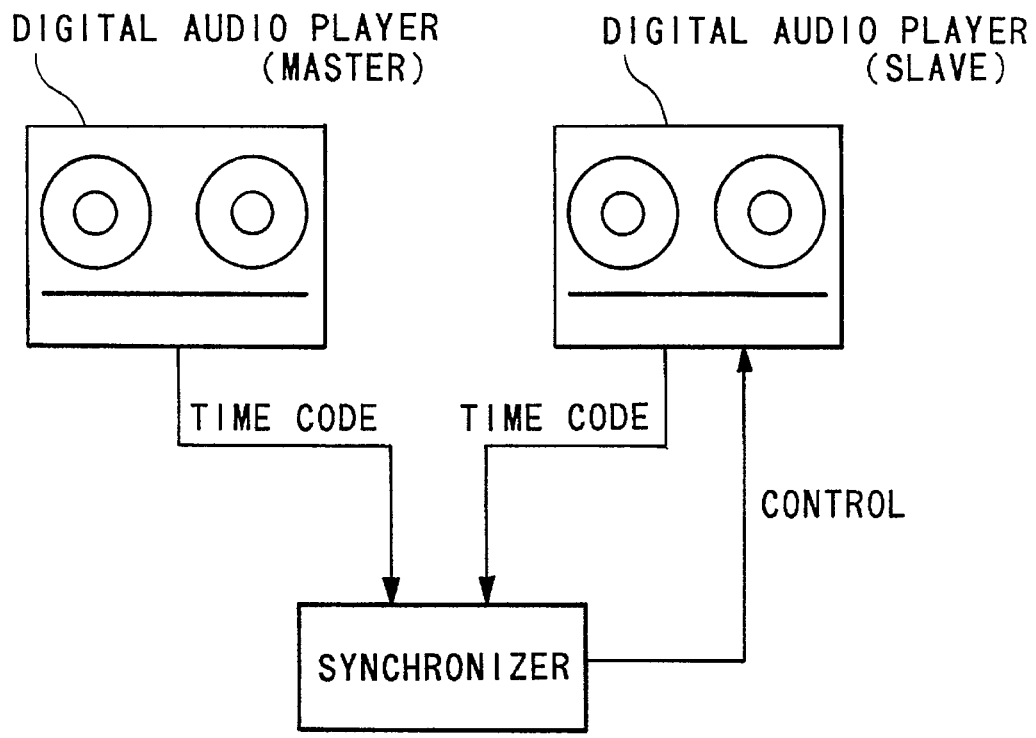
FIG. 3 is an explanatory diagram showing the connected state in the case in which synchronous play is conducted between conventional digital audio player.
Figure 4:
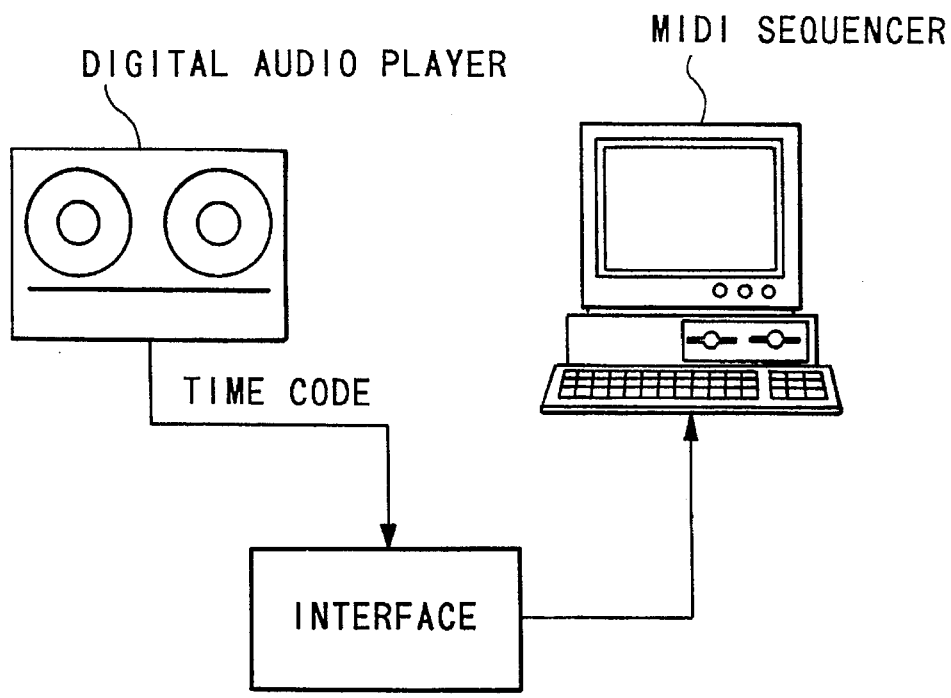
FIG. 4 is an explanatory diagram showing the connected state in the case in which synchronous play is conducted between a conventional digital audio player and a MIDI sequencer.

When, in the beginning, a recording initiation directive is carried out by the means of the setting of panel switch 4, A/D converter 8 converts the audio signals supplied to input terminals 8L and 8R to digital signals, and supplies these signals to the writing circuit $9_1$ shown in FIG. 2. Writing circuit $9_1$ writes the digital signals as audio data into waveform data memory 10a.

Next, when a recording time completion directive is conducted by means of the setting of panel switch 4, writing circuit $9_1$ writes data corresponding to the sampling frequency Fs at the time of conversion from analog to digital, data corresponding to the amount of time from the initiation of recording to the completion of recording (recording time), and data corresponding to the number of sampling words from the initiation of recording to the completion of recording, into header memory 10b.

By means of this, audio data are stored in waveform data memory 10a, and furthermore, various data relating to these audio data are stored in header memory 10b.

(2) Synchronous play directive operation

This directive conducts synchronous play with the MIDI clock which is supplied from the MIDI sequencer, reads the data which are stored in PCM memory 10, and supplies these to the exterior.

First, when a playback initiation directive is conducted by means of the setting of panel switch 4, header read circuit $9_2$ reads the various data relating to the audio data from header memory 10b, and supplies the sampling frequency Fs data to audio data read circuit $9_3$, and furthermore, supplies data relating to the number of sampling words and to the recording time to computing circuit $9_4$.

Then, computing circuit $9_4$ conducts calculations based on the values of the recording time, the number of sample words, and the tempo data, calculates a value for word clock control data P, and supplies this to audio data read circuit $9_3$. By means of this, audio data read circuit $9_3$ is set so as to generate a word clock each time a number of words of the audio data, which number is based on word clock control data P, has been read.

Audio data read circuit $9_3$ reads audio data from waveform data memory 10a, and supplies these data as output data to the D/A converter 11 which is shown in FIG. 1. These output data are converted to analog signals by means of D/A converter 11, and are outputted to the exterior through the medium of output terminals 11L and 11R.

Furthermore, audio data read circuit $9_3$ generates a word clock each time the number of words described above of the audio data has been read, and outputs this to reading control circuit $9_5$ and a bus. At this time, reading control circuit $9_5$ compares the timing of the MIDI clock and the timing of the word clock, and controls the reading speed of the audio data read circuit $9_3$ so that these 2 timings are in agreement.

By means of this, audio data read circuit $9_3$ reads audio data synchronously with the MIDI clock which is supplied from external sources, so that the output signal of the present preferred embodiment is completely synchronized with the timing of the MIDI clock. Accordingly, it is possible to conduct the synchronization of the present preferred embodiment and a MIDI sequencer.

The word clock which is supplied by the bus is supplied to CPU 1. CPU 1 creates a MIDI clock at each period of the word clock. By means of this, CPU 1 supplies a MIDI signal, containing a MIDI clock which is synchronized with the reading speed of the audio data, to the MIDI sequencer through the medium of MIDI output terminal 5. In this way, the present preferred embodiment generates a synchronizing signal and thus functions as a synchronizing signal generating device.

In accordance with the preferred embodiment described above, it is possible to conduct synchronization without the use of time codes, so that the data which are to be recorded in digital audio instruments may simply be audio data and data relating to recording. Accordingly, it is possible to greatly limit the necessary memory capacity.

In the above-described preferred embodiment, a word clock was generated with a period identical to that of the synchronizing signal supplied from the exterior, and the reading speed and the playback speed of the audio data were controlled; however, it is also permissible to create the word clock after a fixed number of words (for example, 1000 words), and to compare this word clock with the synchronizing signal supplied from the exterior. In such a case, it is acceptable to control the reading speed of the audio data so that the ratio of the period of the word clock and the period of the synchronizing signal supplied from the exterior has a value which is determined based on the recording time, the number of sample words, and the type of synchronizing signal.

Furthermore, so long as the PCM memory 10 has a waveform data memory 10a region and a header memory 10b region, any type of memory device is acceptable (for example, magnetic tape, hard disk devices, optical disk devices, or the like).

In addition, it is acceptable if the synchronizing signal supplied from the exterior is not a MIDI clock. In such a case, the synchronizing signal, for example, the time codes, are inputted through the medium of interface 7, the type of synchronizing signal is directed by means of panel switch 4, and the content of the calculations of computing circuit $9_4$ is changed.

As many apparently widely-differing embodiments of this invention may be made without departing from the spirit and scope thereof, it is not limited to this specific embodiment thereof, except as defined in the appended claims.

What is claimed is:

1. A digital audio synchronous player comprising:

memory means for storing audio data having a plurality of words which represent digitally recorded audio signals and data relating to recording conditions of said audio signals;

first reading means for reading out said audio data stored in said memory means;

second reading means for reading out said data relating to recording conditions stored in said memory means;

word clock signal generating means for generating a word clock signal each time a number of words of said audio data read by said first reading means reaches a value determined based on said data relating to recording conditions read by said second reading means; and synchronizing signal generating means for generating a synchronizing signal based on said word clock signal.

2. A digital audio synchronous player in accordance with claim 1, wherein said word clock signal generating means generates said word clock signal each time a number of words of said audio data read by said first reading means reaches a multiple value of a fixed number determined based on said data relating to recording conditions read by said second reading means, and on a type of synchronizing signal.

3. A digital audio synchronous player in accordance with claim 1 further comprising:

analogue/digital conversion means for converting analogue audio signals provided from an external device into digital audio signals by sampling said analogue audio signals at a sampling frequency; and writing means is provided for writing said audio data corresponding to the analogue audio signals and said data relating to recording conditions of said audio data on said memory means, wherein one sample data of said audio signals sampled at the sampling frequency is called one word.

4. A digital audio synchronous player in accordance with claims 1, wherein said data relating to recording conditions has a recording period of said audio signals and a number of words of said audio data for the recording period.

5. A digital audio synchronous player in accordance with claim 1, wherein said synchronizing signal is a MIDI clock signal.

6. A digital audio synchronous player in accordance with claim 1, further comprising:

reading control means for receiving a reading synchronizing signal and for controlling a reading speed of said first reading means by comparing said word clock signal with said reading synchronizing signal;

setting means for setting a tempo of said reading synchronizing signal.

7. A digital audio synchronous player in accordance with claim 1, further comprising selecting means for selecting a type of synchronizing signal, whereby said word clock signal generating means generates a word clock signal having a period corresponding to the type of synchronizing signal selected by said selecting means.

8. A digital audio synchronous player comprising:

memory means for storing audio data having a plurality of words which represent at least one digitally recorded audio signal and data relating to recording conditions of said audio signal;

input means for inputting a synchronizing signal from an exterior source;

first reading means for reading out said audio data stored in said memory means;

second reading means for reading out said data relating to recording conditions stored in said memory means;

word clock signal generating means for generating a word clock signal each time a number of words of said audio data read by said first reading means reaches a value determined based on said data relating to recording conditions read by said second reading means; and reading speed control means for controlling a reading speed of said first reading means by comparing said word clock signal with said synchronizing signal.

9. A digital audio synchronous player in accordance with claim 8 further comprising:

analogue/digital conversion means for converting analogue audio signals provided from an external device into digital audio signals by sampling said analogue audio signals at a sampling frequency; and writing means is provided for writing said audio data corresponding to the analogue audio signals and said data relating to recording conditions of said audio data on said memory means, wherein one sample data of said audio signals sampled at the sampling frequency is one word.

10. A digital audio synchronous player in accordance with claims 8, wherein said data relating to recording conditions has a recording period of said audio signals and a number of words of said audio data for the recording period.

11. A digital audio synchronous player in accordance with claim 8, wherein said synchronizing signal is a MIDI clock signal.

12. A digital audio synchronous player in accordance with claim 11, further comprising setting means for setting a tempo of said MIDI clock signal.

13. A digital audio synchronous player in accordance with claim 8, further comprising selecting means for selecting a type of synchronizing signal, whereby said word clock signal generating means generates a word clock signal having a period corresponding to the type of synchronizing signal selected by said selecting means.

14. A digital audio synchronous player comprising:

memory means for storing audio data having a plurality of words which represent digitally recorded audio signals and data relating to recording conditions of said audio signals;

first reading means for reading out said audio data stored in said memory means;

second reading means for reading out said data relating to recording conditions stored in said memory means; and synchronizing signal generating means for generating a synchronizing signal based on a number of words of said audio data read by said first reading means, and on said data relating to recording conditions read by said second reading means.

15. A digital audio synchronous player in accordance with claim 14 wherein said synchronizing signal generating means comprises:

a word clock signal generating means for generating a word clock signal each time a number of words of said audio data read by said first reading means reaches a value determined based on said data relating to recording conditions.

16. A digital audio synchronous player in accordance with claim 14 wherein said synchronizing signal generating means comprises:

a word clock signal generating means for generating a word clock signal each time a number of words of said audio data read by said first reading means reaches a predetermined value.

17. A digital audio synchronous player comprising:

memory means for storing audio data having a plurality of words which represent digitally recorded audio signals and for storing data relating to recording conditions of said audio signals;

first reading means for reading out said audio data stored in said memory means;

second reading means for reading out said data relating to recording conditions stored in said memory means;

control value determining means for determining a control value based on said data relating to recording conditions read by said second reading means;

word clock signal generating means for generating a word clock signal each time a word count of said audio data read by said first reading means reaches said control value, said word clock signal generating means including a word counter generating said word count; and synchronizing signal generating means for generating a synchronizing signal based on said word clock signal.

18. A digital audio synchronous player in accordance with claim 1 wherein said recording conditions are selected from a group including recording time, sample word count and sample frequency.

19. A digital audio synchronous player in accordance with claim 1 wherein said memory means includes:

a waveform memory storing said plurality of words representing digitally recorded audio signals; and a header memory storing said data relating to recording conditions of said audio signals.

* * * * *